United States Patent [19]
Kemp

[11] Patent Number: 5,609,402
[45] Date of Patent: Mar. 11, 1997

[54] TRADER DESK FRAME

[75] Inventor: John Kemp, Columbia, S.C.

[73] Assignee: Specialized Banking Furniture (International), Newberry, S.C.

[21] Appl. No.: 636,725

[22] Filed: Apr. 23, 1996

Related U.S. Application Data

[63] Continuation of Ser. No. 420,444, Apr. 10, 1995, abandoned, which is a continuation of Ser. No. 162,491, Dec. 3, 1993, abandoned.

[51] Int. Cl.⁶ .................................................. A47B 47/00
[52] U.S. Cl. ........................... 312/265.4; 211/94; 108/50; 312/265.2
[58] Field of Search ........................... 312/265.1, 265.4, 312/111, 198, 265.2, 265.3, 223.3; 211/94, 87; 108/50, 108, 152, 132; 52/720; D6/484, 422, 423, 511, 481, 478

[56] References Cited

U.S. PATENT DOCUMENTS

| | | | |
|---|---|---|---|
| 2,710,241 | 6/1955 | Lieberman | 312/265.3 |
| 4,148,535 | 4/1979 | Fenwick | 312/265.1 X |
| 4,694,965 | 9/1987 | Parnell | 211/87 |
| 4,798,423 | 1/1989 | LaCour | 312/223.3 |
| 4,802,422 | 2/1989 | Beard . | |
| 4,821,535 | 4/1989 | Wassilak et al. | 312/199 X |
| 4,836,625 | 6/1989 | Catta | 312/265.1 |
| 4,838,177 | 6/1989 | Vander Park | 108/50 X |
| 4,848,855 | 7/1989 | Cone | 211/87 X |
| 4,958,259 | 9/1990 | Berg et al. | 312/265.2 X |
| 4,974,913 | 12/1990 | Vogt et al. | D6/484 X |
| 4,997,240 | 3/1991 | Schmalzl et al. | 312/265.4 |
| 5,016,405 | 5/1991 | Lee . | |
| 5,078,055 | 1/1992 | Bellini et al. . | |

FOREIGN PATENT DOCUMENTS

| | | | |
|---|---|---|---|
| 518261 | 12/1991 | European Pat. Off. | 312/223.3 |

OTHER PUBLICATIONS

80/20 Inc. Catalog #0692A (1992), complete.
80/20 Inc. Catalog #1094 (1995), complete.

*Primary Examiner*—Peter M. Cuomo
*Assistant Examiner*—Janet M. Wilkens
*Attorney, Agent, or Firm*—Hardaway Law Firm P.A.

[57] ABSTRACT

A desk frame (1) for trader desks is provided comprising a first lateral support (2), a first vertical support (5), and a first cross support (11) interconnected to each other at respective ends, a second lateral support (21) superposed onto the first lateral support (2), a diagonal support (23) interconnected to the second lateral support (21) and inclined at an angle with respect to an axis of the second lateral support (21), and a third lateral support (24) interconnected to the diagonal support (23). Supports may be interconnected to each other by three-way corner connectors (67) or angled connectors (73), and they may be directly connected to one another by means of an insert (20) seated within an indentation of a support and a fastener engaging the insert. The desk frame (1) is strengthened by two-way gussets (114) and three-way gussets (84) provided at junctions of supports. The desk frame (1) may be further provided with an extension (91) to guide doors (42) allowing for storage and access to wiring within the desk frame (1). A back railing (128) is attached to an upper support (29) to define the back of desk frame (1), to provide accessory mounting means allowing installation of such objects as monitor stands, shelves, and lamps, and to facilitate capping of a back-to-back connection of desk frame (1) with another desk frame. Means for permitting side-to-side connection between such desk frames is also provided.

25 Claims, 12 Drawing Sheets

TRADER DESK FRAME

This application is a file wrapper continuation of application Ser. No. 08/420,444, filed Apr. 10, 1995, abandoned, which was a file wrapper continuation of Ser. No. 08/162,491 filed Dec. 3, 1993, now abandoned.

BACKGROUND OF THE INVENTION

The present invention relates to a desk frame that can be mass produced for use as a trader desk.

Trader desks have been used for years by businesses, most notably banks and exchanges. The trade desk construction allows desks to be laid from end to end thus allowing free movement from desk to desk without the restriction of end frames and panels. Another benefit of the trader desk construction is the easy installation of monitors and similar devices onto the work surface of the desk. The framework permits wiring to be freely distributed through the frame, since the frame is not of solid construction.

U.S. Pat. No. 5,016,405, which is illustrative of desk art generally, discloses a workstation module comprised of a plurality of work surface areas in juxtaposed relation circumscribing a central core; however, the means for connecting one workstation to another is not disclosed. U.S. Pat. No. 5,078,022 teaches a working table comprised of a base frame to which leaf frames are detachably coupled through pin-and-hinge type connectors but does not teach intercoupling of base frames to one another.

SUMMARY OF THE INVENTION

It is an object of the present invention to provide a desk framework which overcomes the limitations of the prior art and allows free movement for the desk user.

It is a further object of the present invention to provide optimal lateral distance in the desk while still minimizing the use of materials.

It is a still further object of the present invention to provide a dealer desk construction which facilitates rearrangement of desks by providing a plurality of means interconnecting adjoining desks.

It is a still further object of the present invention to construct a frame that is lighter and less expensive than the existing steel frames.

It is a still further object of the present invention to allow for ease and flexibility of assembly.

These as well as other objects are accomplished by a desk frame comprising a first lateral support, a first vertical support, and a first cross support interconnected to one another at respective ends, a second lateral support superposed onto the first lateral support, a diagonal support connected to the second lateral support and inclined at an angle with respect to an axis of the second lateral support, and a third lateral support interconnected to the diagonal support.

BRIEF DESCRIPTION OF THE DRAWINGS

FIG. 5-A is a perspective view of a three-way corner connector.

FIG. 5-B is a perspective view of the connector illustrated in FIG. 5-A showing its interconnection of three supports in conjunction with a three-way gusset.

FIG. 7-A is a perspective view of a three-way gusset positioned at a junction of three supports.

FIG. 7-B perspective view of a two-way gusset.

FIG. 8-A is a perspective view of a box frame isolated from remaining supports of a desk frame of the present invention, to which a railing is attached at its back.

FIG. 8-B is a side elevation view of the back railing illustrated in FIG. 8-A.

FIG. 8-C is a side elevation view of a modified embodiment of the back railing illustrated in FIG. 8-B.

DETAILED DESCRIPTION

In accordance with this invention, a durable, light weight desk frame has been developed having supports preferably constructed of an aluminum extrusion having a cross section configured to permit attachment to other desk frames, as well as end panels. A complete aluminum frame brings flexibility to the assembly line, since long cross supports of aluminum can be produced and easily divided to provide prompt response to the demand of consumers.

Figure 1:
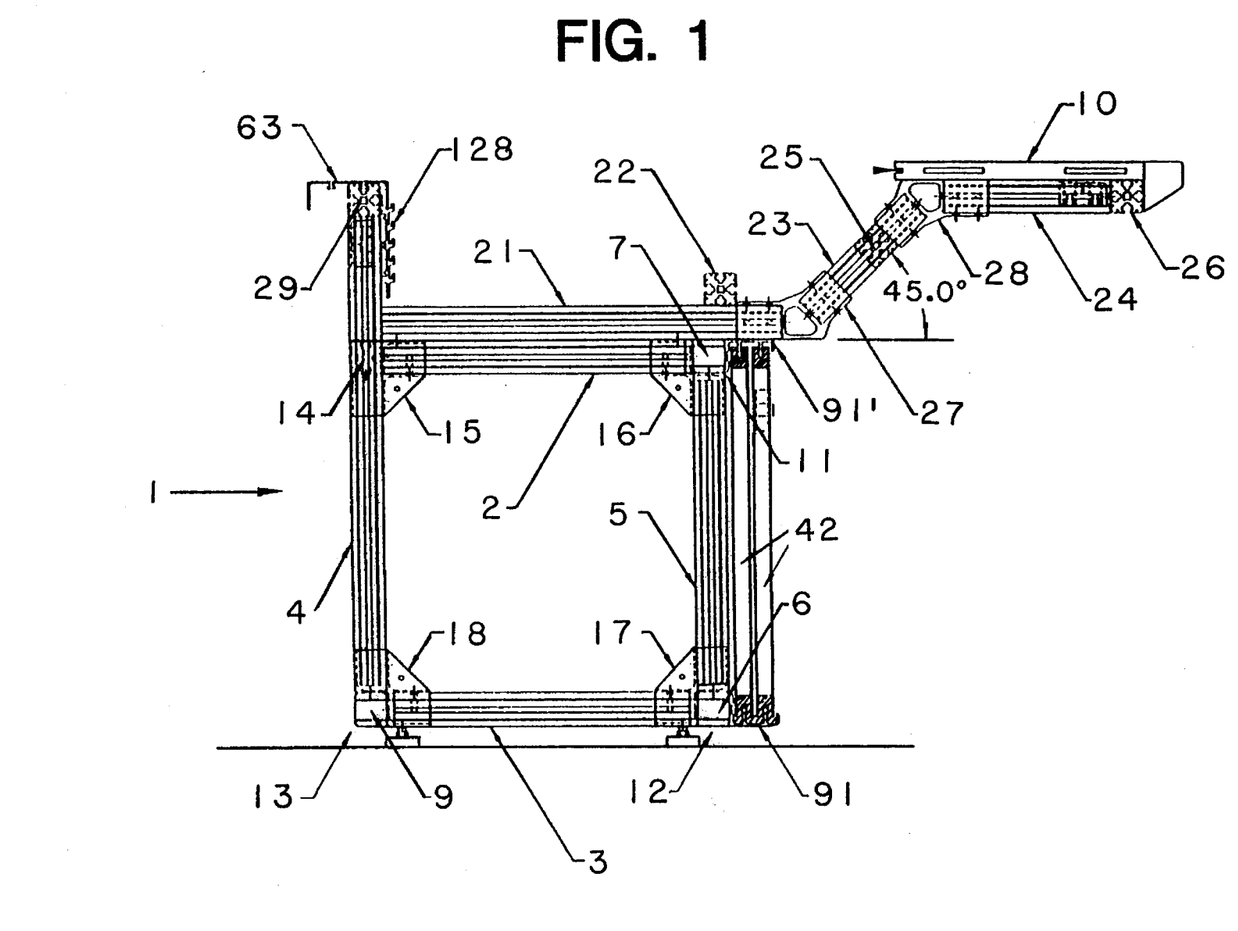
FIG. 1 is a side elevation view of a desk frame constructed in accordance with a preferred embodiment of the present invention, said desk frame including angular connectors, corner connectors, gussets, extensions, and a back railing.

As seen in FIG. 1, the desk frame 1 includes a first lateral support 2, a first vertical support 5, a second vertical support 4, and a first cross support 11. The desk frame 1 is additionally defined by a second lateral support 21 superposed onto the first lateral support 2, a diagonal support 23 inclined at an angle, preferably 45°, with respect to a longitudinal axis of the second lateral support 21 and interconnected at one end to the lateral support 21, and a third lateral support 24 interconnected to the diagonal support 23 at the other end thereof.

Diagonal support 23 is interconnected to second lateral support 21 by a first angular connector 27. Similarly, the diagonal support 23 is interconnected to lateral support 24 by a second angular connector 28. These angular connectors will be described in detail with regard to FIG. 6.

Other corner cross supports are shown at 12, 13 and 14, and another lateral support 3 extends between cross supports 12 and 13. For added stability, the desk frame 1 may be further provided with a cross support 25 connected to the diagonal support 23 intermediate interconnections thereof with first lateral support 2 and third lateral support 24. As shown in FIG. 1, edges defining the cross section of the cross support 23 are flush with the sides of the diagonal support 25. A front cross support 26 may be attached to a free end of the third lateral support 24, preferably in the manner discussed in detail with regard to FIG. 3, to define the front of the desk frame 1. Each of these supports can vary in length, thus allowing flexibility in selecting desk frame dimensions.

An upper surface 10, constructed of wood, plastic, or a composite thereof, can be superposed onto third lateral support 24 and onto front cross support 26 to provide a work surface area. Upper surface 10 may be connected to one or both of these supports in any manner consistent with the objects of the present invention.

Figure 7A:
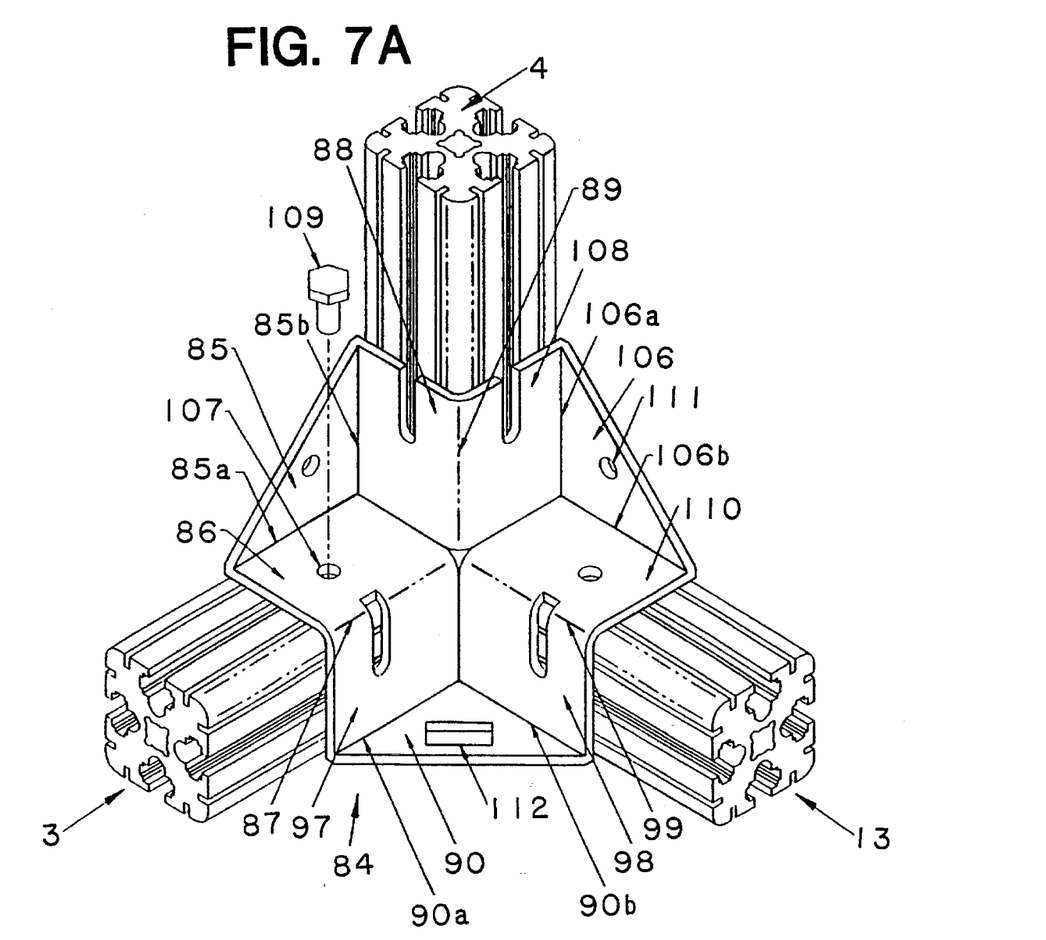

Each junction of a lateral support, vertical support, and a cross support is provided with a three-way gusset, shown at 15, 16, 17, and 18. Each of these gussets are attached to respective sides of each of these supports to stiffen the desk frame and will be discussed in detail with regard to FIG. 7-A.

Figure 5A:
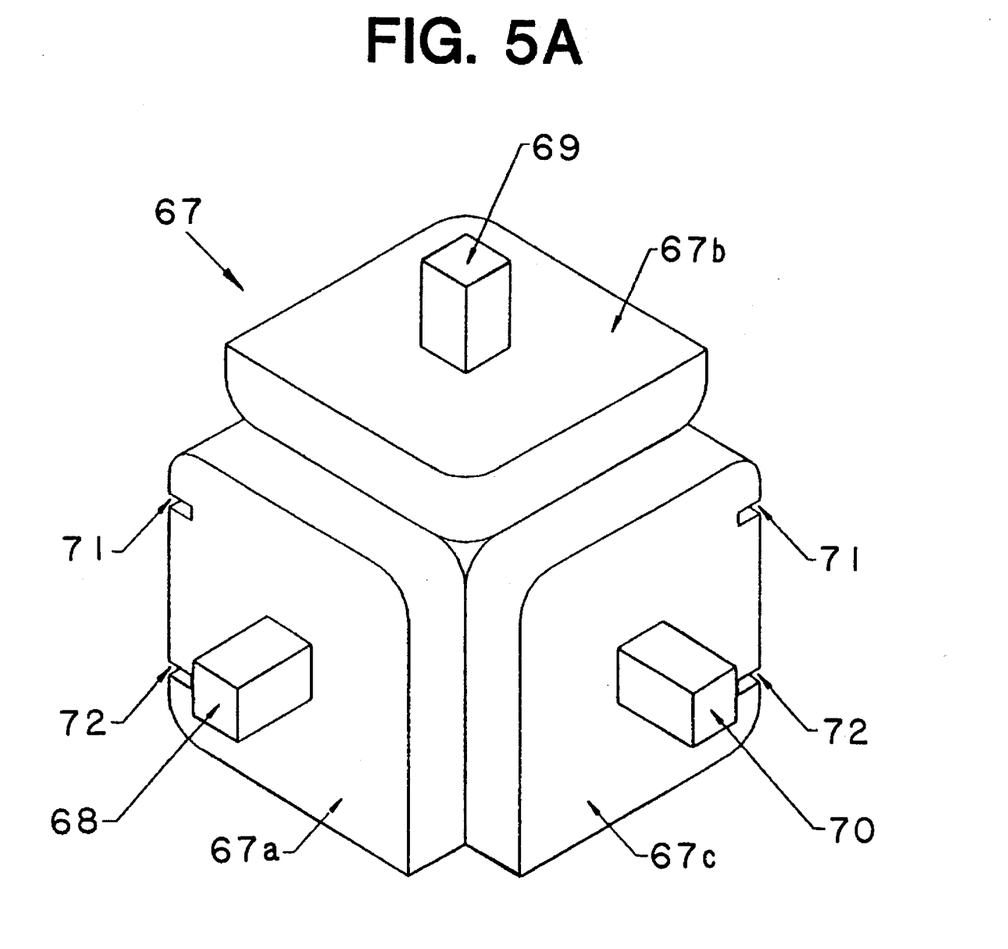
Figure 5B:
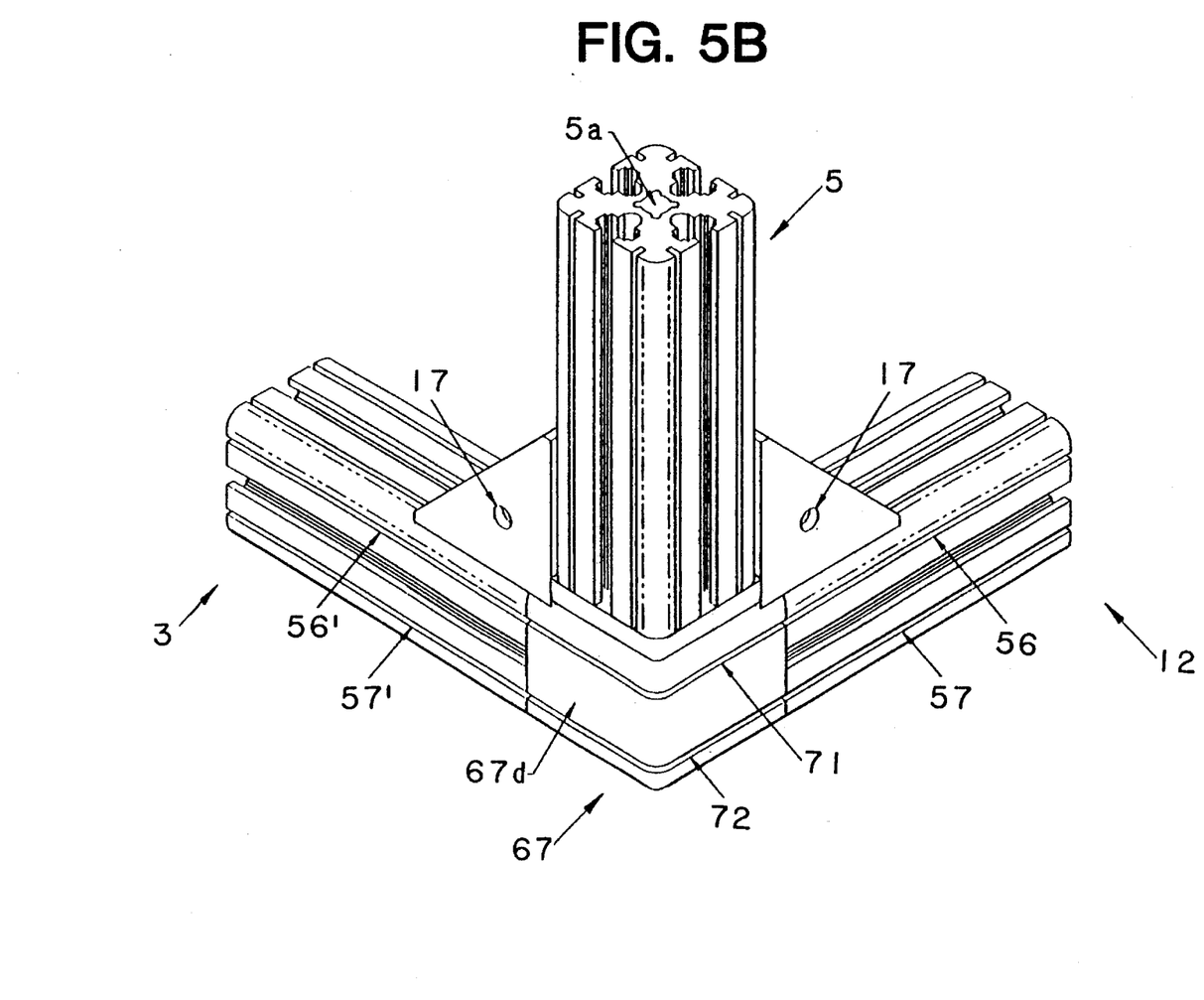

Three-way corner connectors 6, 7 and 9 are provided to interconnect ends of lateral, vertical, and cross supports. Specifically, corner connector 6 interconnects ends of supports 3, 5, and 12, corner connector 7 interconnects ends of supports 2, 5, and 11, and corner connector 9 interconnects ends of supports 3, 4, and 13. The details of a corner connector will be described in detail with regard to FIGS. 5-A and 5-B.

Note that in the preferred embodiment there is no corner connector at a junction between supports 2, 4, and 14. This is so because second vertical support 4 is not terminated at this junction but continues to extend beyond the upper lateral supports. Accordingly, an end of cross support 14 is connected directly to one side of second vertical support 4, and a back end of first lateral support 2 is connected directly to another side of second vertical support 4. This is accomplished by means of an insert, preferably having internal threads, placed within an aperture drilled into an end of each support extending substantially parallel to a longitudinal support axis. An aperture coaxial with the insert is drilled through the second vertical support 4. A threaded fastener passes through this aperture to mate with the threads of the insert to provide the direct connection between the end of one support and the side of another support. Such a connection will be described in detail with regard to FIG. 3.

Figure 8A:
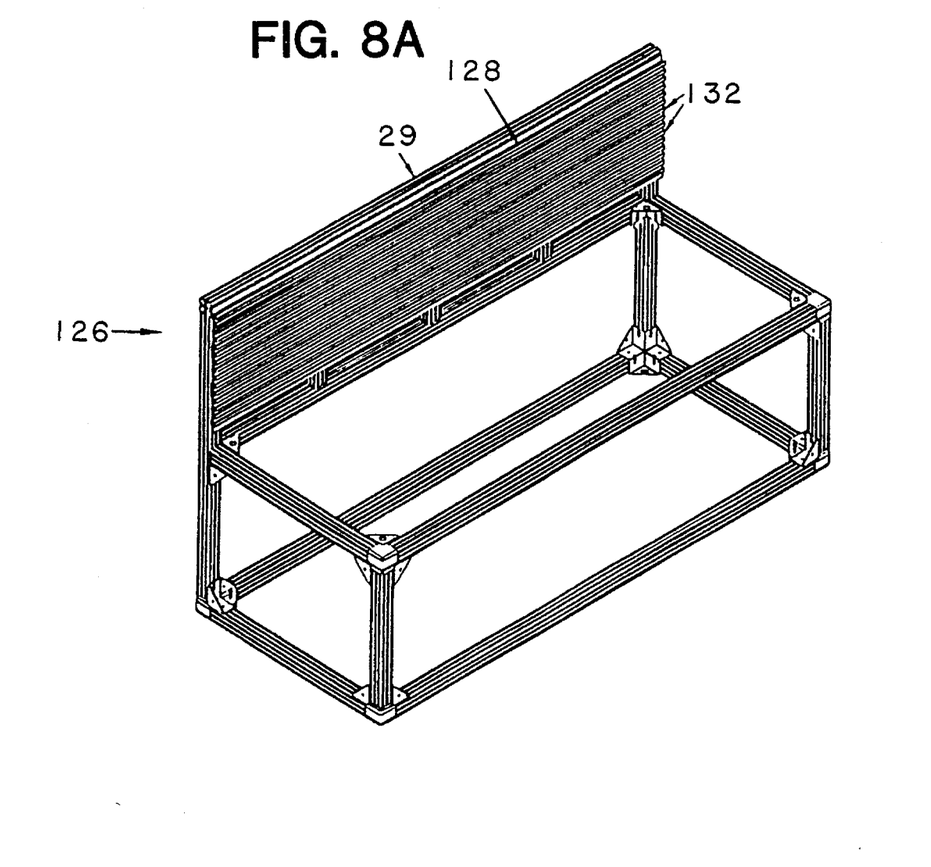
Figure 8B:
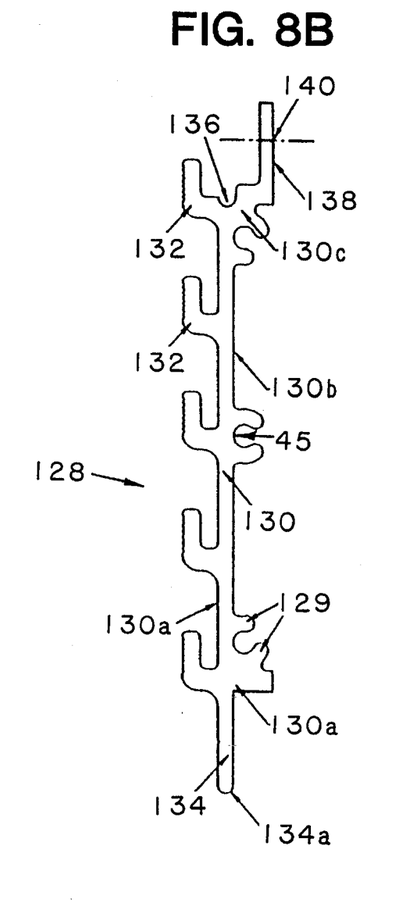

A cross support 29 running parallel to cross support 14 is directly attached to second vertical support 4 in the manner discussed above. Second vertical support 4 and cross support 29 form the back of the desk frame 1. A back railing 128 can be bolted to the cross support 29 to further define the back of the desk frame. The back railing 128, which allows connection to other railing members or to desk accessories such as monitor stands, shelves, and lamps, will be discussed in detail with regard to FIGS. 8-A & 8-B.

Second lateral support 21 can be of varying length thus allowing flexibility in leg room. Preferably, second lateral support 21 has one end terminating at second vertical support 4 and the other end extending beyond first lateral support 2 and three-way corner connector 7. Second lateral support 21 is directly connected to first lateral support 2 using inserts seated within an indentation of first lateral support 2 and fasteners protruding through aligned bores formed within second lateral support 21 to engage the associated inserts.

A cross support 22 may be mounted on the upper surface of second lateral support 21 at any beneficial location to enhance the rigidity of the desk frame 1 and to define the front boundary of the monitor shelf onto which objects such as monitors and switchboards can be placed.

FIG. 1 additionally illustrates extensions 91 and 91' which are engaged with the slots of three-way corner connectors 6 and 7, respectively. These extensions are used for attaching sliding doors, such as at 42, to the desk frame 1. Such doors can be utilized to allow access to the wiring within the framework and also for storage.

Figure 2:
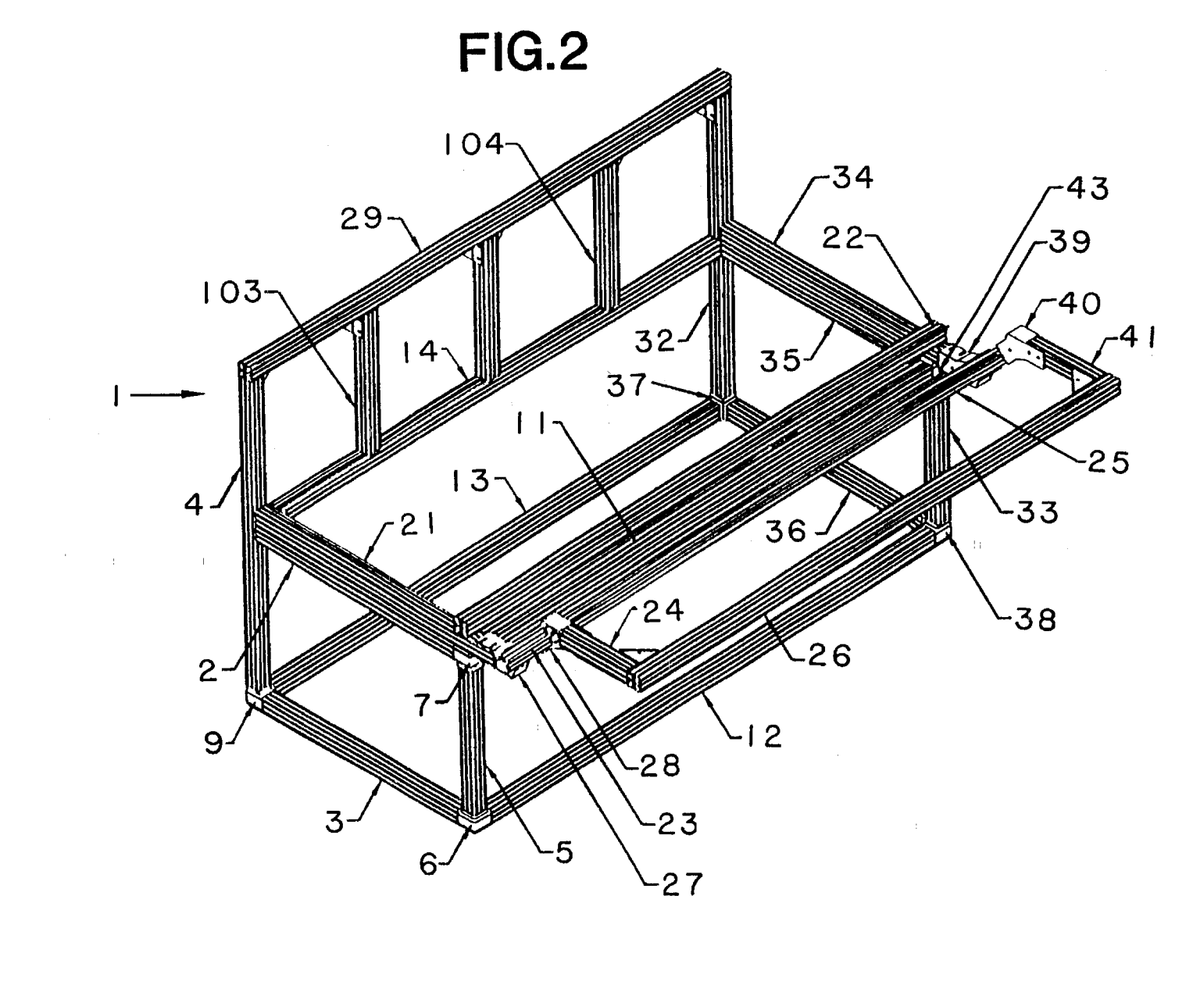
FIG. 2 is a perspective view of the desk frame illustrated in FIG. 1.

Referring to FIG. 2, showing the desk frame 1 in a perspective view, lateral supports 35, 36, 34 and 41 correspond to lateral supports 2, 3, 21 and 24, respectively. Vertical supports 32 and 33 correspond to vertical supports 4 and 5, respectively. Angular connectors 39 and 40 correspond to angular connectors 27 and 28. Corner connectors 43, 37 and 38 correspond to corner connectors 7, 9 and 6, respectively. A diagonal support, not shown in FIG. 2 but connected at its ends to angular connectors 40 and 43, corresponds to diagonal support 23 (FIG. 1). Vertical supports 4, 5, 32, and 33 lateral supports 2, 3, 35 and 36, and cross supports 11, 12, 13 and 14 define the box frame. Vertical supports 4, 5 and 33 and cross support 29 form the back of the desk frame. Rear vertical supports such as at 103 and 104 can be added to further strengthen the back of the frame 1 to support a back rail or wall and are directly connected to cross members 14 and 29. Any number of rear vertical supports can be utilized to provide added strength to the back of the frame. Lateral supports 21, 24, 34 and 41, cross support 26, and the diagonal supports define the working surface of the desk frame 1. Cross support 25 provides added stability to the working surface.

Figure 3:
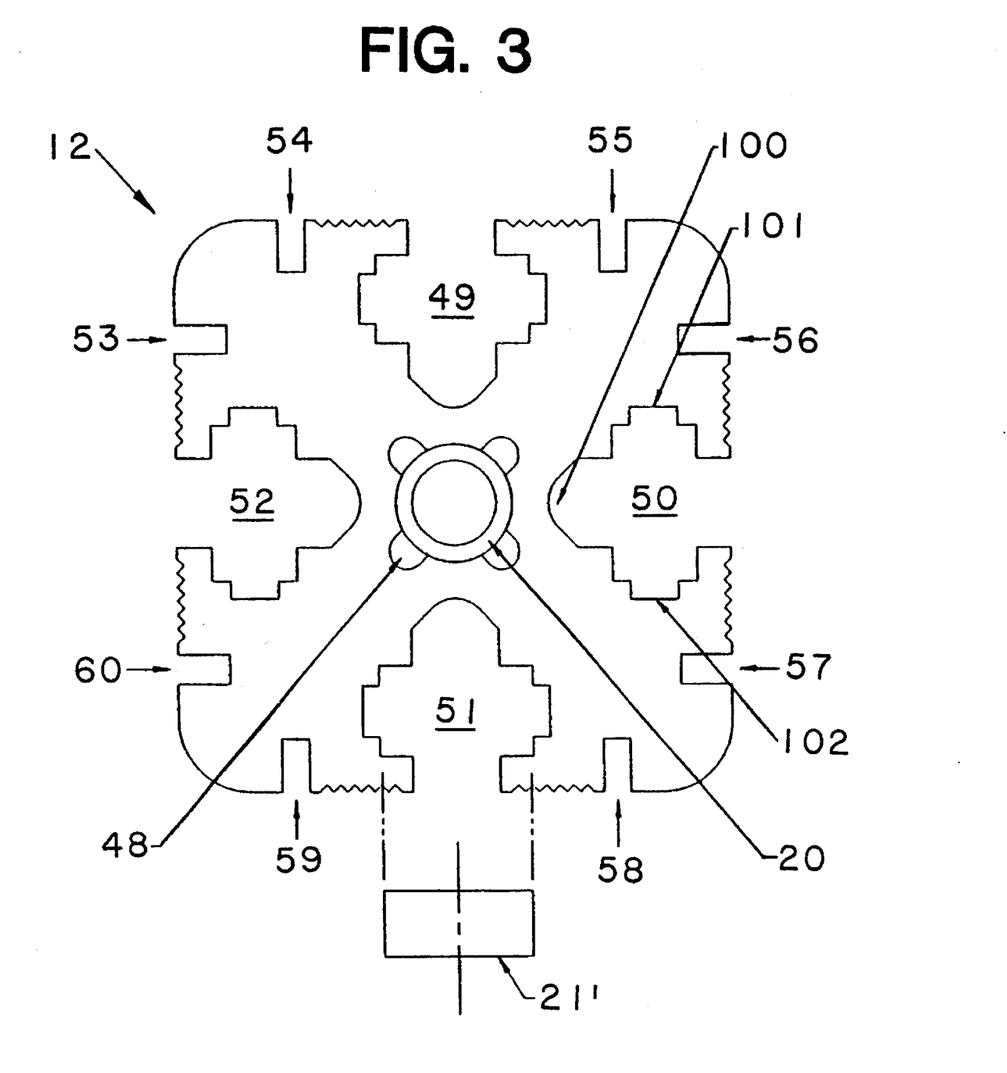
FIG. 3 is a cross-sectional view of a support including a rectangular cavity, four indentations and eight slots.

As seen in FIG. 3, a cross section of a support preferably constructed of an aluminum extrusion, such as lower cross support 12, is generally rectangular in shape and is provided with a cavity 48, slots 53–60 and indentations 49–52. The cavity 48, which is parallel to the central axis of the support 12, provides a means through which the support 12 can be attached to corner connectors (such as 67 in FIG. 5-B). The ideal shape of cavity 48 is circular although rectangular, hexagonal, octagonal or other shapes producing an equivalent result can be utilized.

The indentations 49–52 provide a reduced material cost and yet substantially retain the material strength evenly across the support 12. Each indentation includes two opposing prongs 101, 102, each prong forming a two-tiered rectangular shape. An arcuate cut-out section 100 begins in a rectangular fashion and then forms a perfect circular arc.

Figure 4:
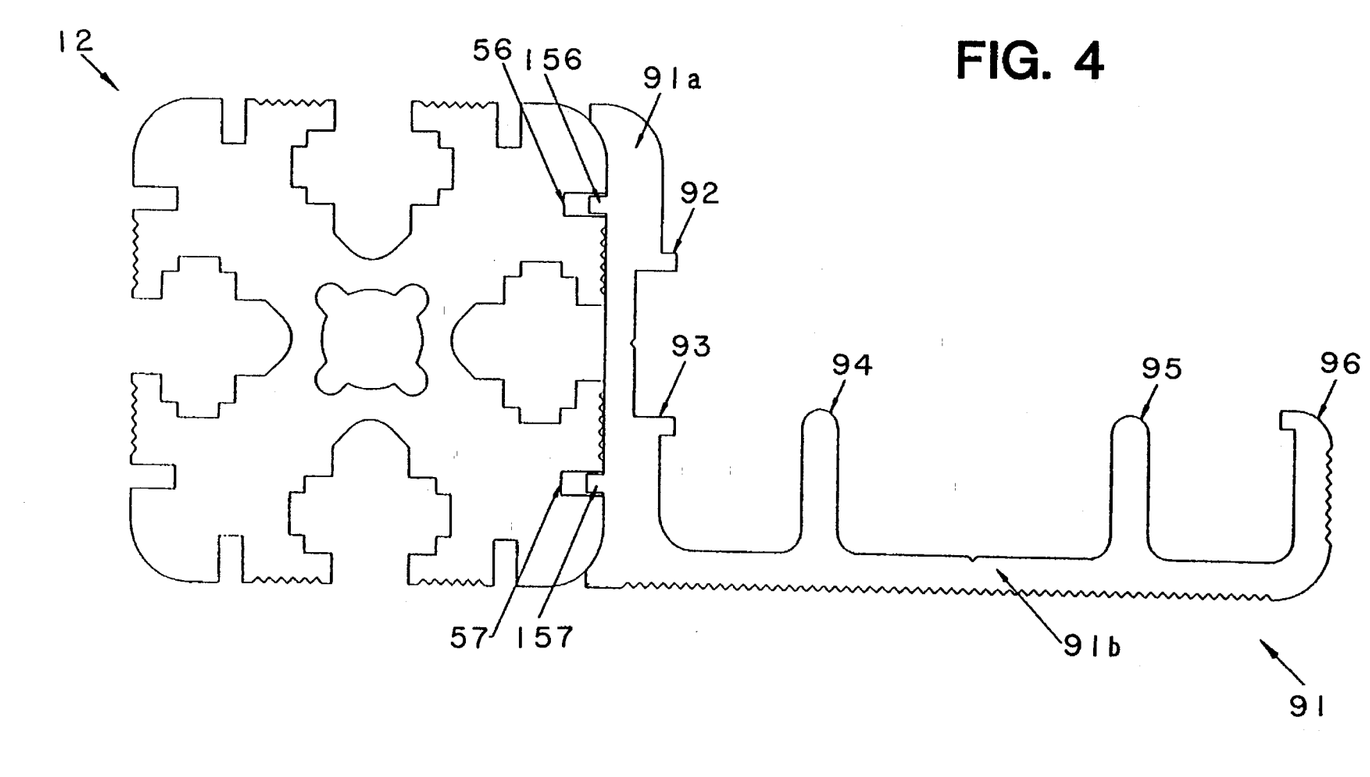
FIG. 4 is a side elevation view of an extension and a support in which the extension is connected to the support via the two slots on the engaged side of the support.

The slots 53–60, located on either side of each indentation 49–52, are rectangular in shape and allow the support 12 to engage an extension (such as 91 in FIG. 4).

End inserts such as at 20 can be placed within the cavity 48, and side inserts, preferably internally threaded square nuts such as at 21', can be placed within indentations such as at 51 to allow a means of connection of an end and a side of member 12, respectively, to other supports. End insert 20 is preferably cylindrical and internally threaded for receiving an externally threaded fastener (not shown); however, threads are not essential, since an insert having smooth internal walls to accomplish a press fit is also contemplated as being within the scope of the present invention. To attach another frame component, such as a three-way gusset or another support to the support 12, an aperture is formed through such a frame component and is aligned over either end insert 20 or side insert 21' seated within support 12. It should be noted that where such a component is another support, apertures can be formed equidistantly from respective ends of that support to reduce error in the installation of support members. The threaded fastener is then passed through such an aperture and rotated so as to mate the threads of the fastener with those of either insert.

FIG. 4 shows an extension 91 connected to lower cross support 12. Extension 91 is comprised of a first leg 91a having rear projections 156, 157 extending from its back side and front projections 92, 93 extending from its front side, and a second leg 91*b* integral with a lower end of first leg 91*a*, extending substantially normal to first leg 91*a* and terminating in a projection 96. Second leg 91*b* is provided with a projection 94 extending upwardly therefrom intermediate first leg 91*a* and projection 96. Another projection 95 extends upwardly from the second leg 91*b* intermediate projections 94 and 96. Rear projections 156, 157 of extension 91 fit into support 12 at slots 56 and 57, thus engaging extension 91 and support 12. An attachment such as a sliding door can be attached to the extension 91 (such as the door unit 42 shown in FIG. 1). If a sliding door is installed, the projections 94, 95 form a track and projections 92, 93, and 96 hold the door 42 fast to the extension 91.

FIG. 5-A shows a three-way corner connector 67, which includes outwardly projecting faces 67*a*, 67*b*, 67*c* oriented at right angles to one another from which pegs 68, 69, 70 respectively extend perpendicularly. Corner connector 67 contains slots 71 and 72 formed into its central body 67*d* (FIG. 5-B) which can be used for extensions or other connectors. Generally, three-way corner connector 67 is utilized for location more than for desk frame stability or strength but nevertheless provides some added support. Strength in the connection of these supports is provided primarily by three-way gusset 17 (FIG. 5-B) of the type discussed in detail with regard to FIG. 7-A at 84.

FIG. 5-B shows corner connector 67 connecting three supports at right angles, for example first vertical support 5, lateral support 3, and lower cross support 12. Pegs 68, 69, 70 are inserted into longitudinal cavities in the supports, such as at 5*a*, to provide the corner connection for the supports. Note that slots 71, 72 align precisely with slots 56, 57, respectively, in lower cross member 12 and likewise with slots 56', 57' in lower lateral support 3. This allows an extension of the type shown in FIG. 4 to engage along its length, for instance, both lower cross support 12 and corner connector 67 via rear projections 156 and 157 (FIG. 4).

Figure 6:
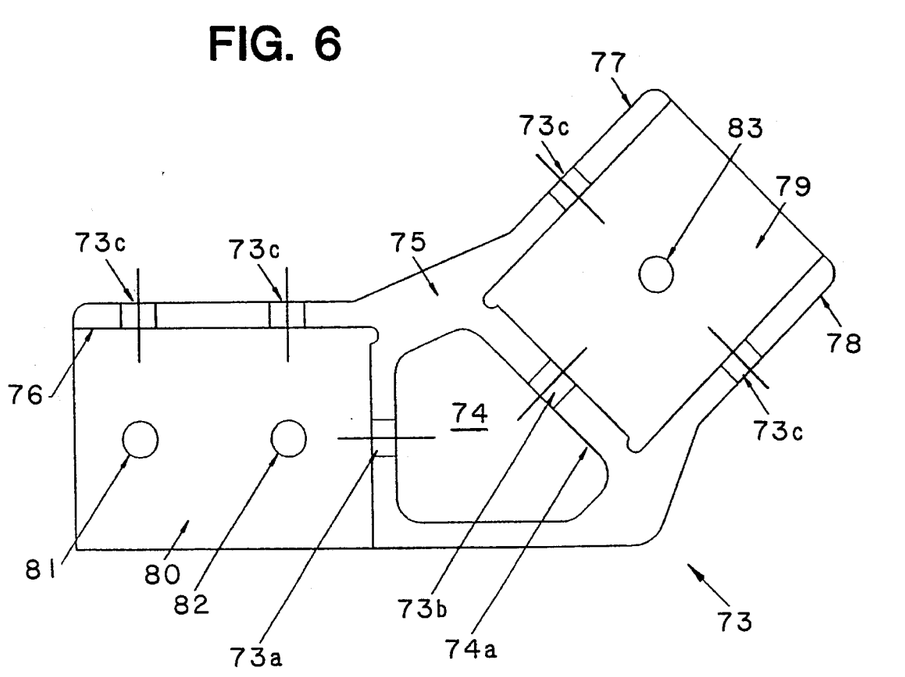
FIG. 6 is a side elevation view of a forty-five degree angular connector with the edges extended to form sockets.

Referring to FIG. 6, an angular connector 73 is of the type shown at 27 and 28 in FIG. 1. The core 74 of the connector 73 is shaped as a square in which one corner is removed and the other corners rounded. In the forty-five degree connector shown, edge 74*a* of core 74 is perpendicular to the forty-five degree line originating from the corner opposing it. The flanges 76–78 of the angular connector 73 extend to form sockets 79 and 80, into which respective apertures 83 and 81 & 82 are formed. Fasteners are placed through these apertures and engage associated side inserts (FIG. 3 at 21') located in the two supports interconnected by the angular connector 73. Also, an end insert (FIG. 3 at 20) of each interconnected support engages a bolt driven through each aperture 73*a*, 73*b* within the angular connector to strengthen the connection. In the preferred embodiment, the angled connector 73 is additionally provided with slots such as at 73*c* in flanges 76–78 to facilitate attachment using additional fasteners. In angles other than forty-five degrees, the core shape 74 would change to accommodate the angle.

Referring to FIG. 7-A, a three-way gusset 84 strengthens desk frame 1 at a junction of ends of three supports, such as second vertical support 4, lateral support 3, and cross support 13. The three-way gusset 84 comprises a first triangular portion 85 including a first leg 85*a* and a second leg 85*b*. A first rectangular portion 86 extends from the first leg 85*a* in a plane normal to that of the first triangular portion 85 and terminates in a first edge 87. A second rectangular portion 88 extends from second leg 85*b* in a plane normal to that of the first triangular portion 85 and terminates in a second edge 89. The gusset 84 further comprises a second triangular portion 90 including a third leg 90*a* and a fourth leg 90*b*. A third rectangular portion 97 extends from third leg 90*a* in a plane normal to that of the second triangular portion 90 and terminates at first edge 87. Similarly, a fourth rectangular portion 98 extends from fourth leg 90*b* in a plane normal to that of the second triangular portion 90 and terminates at a third edge 99. Additionally, a third triangular portion 106 includes a fifth leg 106*a* and a sixth leg 106*b*. A fifth rectangular portion 108 extends from fifth leg 106*a* in a plane normal to that of the third triangular portion 106 and terminates at second edge 89. A sixth rectangular portion 110 extends from sixth leg 106*b* in a plane normal to that of the third triangular portion 106 and terminates at third edge 99.

Each rectangular portion of the three-way gusset 84 is preferably provided with an aperture such as at 107 allowing attachment of the gusset 84 to the supports 3, 4, and 13 with fasteners such as that shown at 109 engaging inserts seated within indentations of the supports. Additionally, each triangular portion is preferably provided with an aperture such as at 111 for permitting attachment of gusset 84 to a gusset of another frame. As shown in FIG. 7-A, the triangular portion parallel to the floor, here second triangular portion 90, may be provided with a rectangular aperture 112 for allowing engagement with a leg for support of the desk frame 1.

Figure 7B:
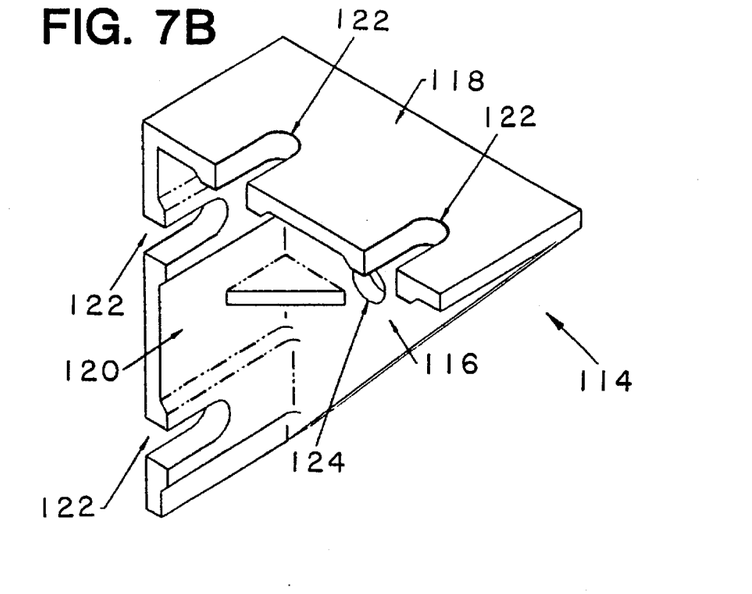
Figure 9:
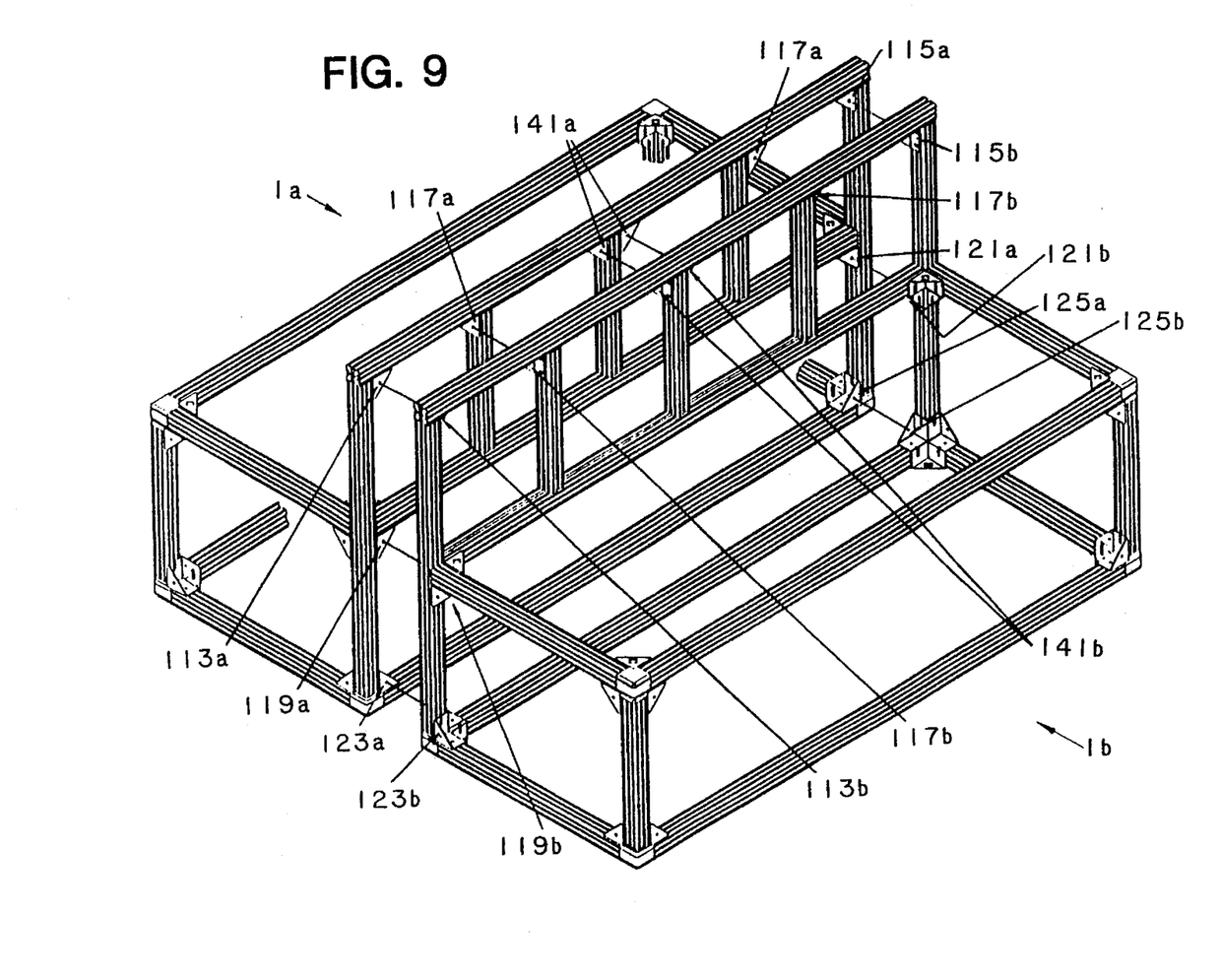
FIG. 9 is an exploded view of the interconnection of desk frames in a back-to-back formation.

FIG. 7-B illustrates a two-way gusset 114 which is used to strengthen the respective junctions between front cross support 26 and lateral supports 24 and 41 (FIG. 2), and between vertical and cross supports defining the back of the desk frame 1 (see FIG. 9). Gusset 114 is comprised of a single triangular portion 116 from which rectangular portions 118, 120 extend in an identical manner to any pair of rectangular portions with respect to an associated triangular portion in the three-way gusset 84. Open-ended slots 122 are formed into the rectangular portions 118, 120 to permit attachment of the gusset 114 to the aforementioned supports. Preferably, each rectangular portion is provided with a pair of open-ended slots 122. Triangular portion 116 is preferably provided with a single aperture 124.

FIG. 8-A illustrates a box frame 126 isolated from the remaining supports which comprise the desk frame 1. A back railing 128 is connected to upper cross support 29 to define the back of the desk frame 1.

FIG. 8-B illustrates the railing 128 in detail. The railing 128 is comprised of a body 130 having a front face 130*a*, a back face 130*b*, a top end 130*c*, and a bottom end 130*d*. A plurality of hooks 132 extend from front face 130*a* allowing engagement of an object with the railing 128. A plurality of curved projections 129 extend from back face 130*b*, each pair of such curved projections defining an arcuate groove 45 between projections 129 in the pair. A first projection 134 extends from bottom end 130*d* terminating in a tip 134*a* of a predetermined shape, preferably a curved shape. An indentation 136 is formed within the top end 130*c* to correspond to curved tip 134*a* so as to allow stacking of railings. A second projection 138 extends upwardly from top end 130*c*, and an aperture 140 is formed into the second projection 138 to allow a fastener to protrude therethrough and engage a threaded insert within the upper cross support 29, thereby connecting the railing 128 to upper cross support 29.

Figure 8C:
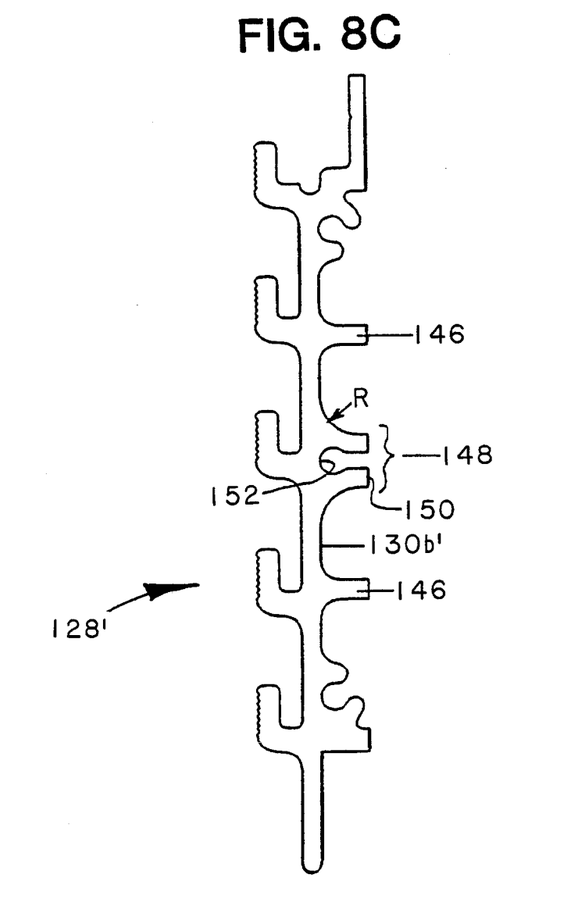

A modified embodiment of the railing 128 is shown in FIG. 8-C at 128'. This embodiment is identical to the railing 128 in FIG. 8-B, except that it includes straight projections 146 projecting outwardly from back face 130*b'*, and that a pair of projections 148 replace the curved projections 129 centrally disposed in the back face 130b of the railing 128. Back face 130b' curves outwardly in a radius R to form each projection in pair 148, the magnitude of radius R, typically about 0.25 inches, being considerably larger than the radius of curvature of the back face 130b' leading to each straight projection 146. Unlike the arcuate ends of curved projections 129 of railing 128 (FIG. 8-B), each projection in pair 148 of railing 128' has a square end such as at 150. An arcuate groove 152 is formed by the interior surfaces of each projection in the pair 148.

A back-to-back connection between desk frame units 1a and 1b is shown in FIG. 9. Units 1a and 1b can be connected by providing nuts and bolts to connect the triangular portions of three-way gussets. To provide the connection shown in FIG. 9, corresponding triangular portions of gussets 141a and 141b, 113a and 113b, 115a and 115b, 117a and 117b, 119a and 119b, 121a and 121b, 123a and 123b, and 125a and 125b are fastened to each other and the connection fixed by the use of a nut and bolt. The back-to-back connection is preferably capped by cover 63 shown in FIG. 1 fitting over the uppermost cross members of frame units 1a and 1b, the respective tips of the legs of the cover 63 fitting into railing indentations such as shown in FIG. 8-B at 136. Cover 63 thereby imparts a smooth appearance to the backs of the joined frame units 1a and 1b.

Figure 10:
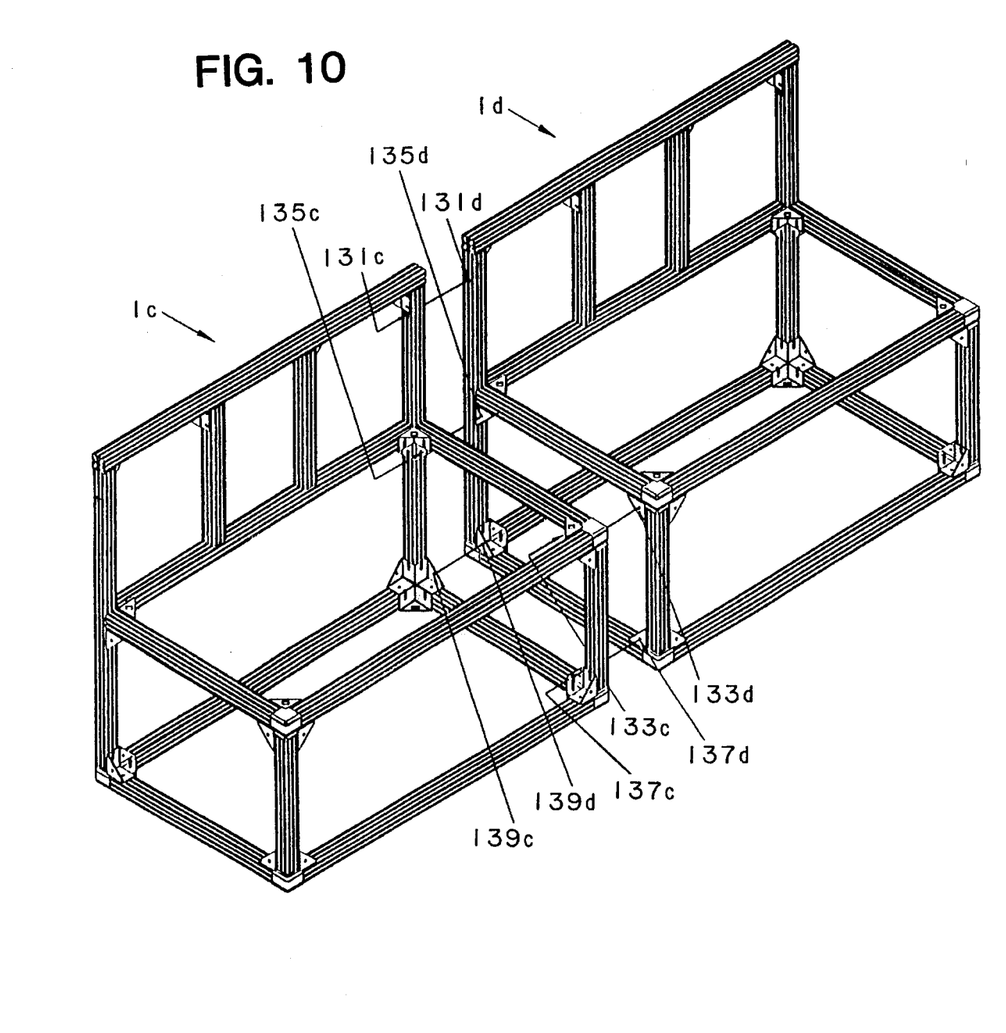
FIG. 10 is an exploded view of the interconnection of desk frames in a side-to-side formation.

FIG. 10 illustrates a side-to-side connection between desk units 1c and 1d. As in FIG. 9, corresponding triangular portions of gussets 133c and 133d, 135c and 135d, 137c and 137d, and 139c and 139d are connected through the use of nuts and bolts to attach desk units 1c and 1d. The backs of desk units 1c and 1d are connected by the use of a bolt passing through a drilled hole 131d in frame 1d and a drilled hole 131c in frame 1c, the bolt being secured by a nut to establish the connection.

The invention provides many assembly options upon the rectangular, aluminum frame and is less expensive and more lightweight than the more commonly used steel frames. Many variations of the above invention may be apparent to those skilled in the art from the reading of the above description. Such variations are embodied in the spirit and scope of the invention as measured by the following claims.

That which is claimed:

1. A desk frame comprising:
   a first lateral support having a first end;
   a first vertical support having a second end;
   said first end and said second end being interconnected to one another to form a junction;
   a first cross support extending from said junction;
   a second lateral support superposed onto said first lateral support;
   a diagonal support having one end interconnected to said second lateral support, said diagonal support inclined at an angle with respect to an axis of said second lateral support;
   a third lateral support interconnected to another end of said diagonal support, said third lateral support constituting a primary desk work surface support; and
   a second vertical support fixedly connected to said first lateral support, said second vertical support extending beyond the elevation of said first lateral support.

2. The desk frame as defined in claim 1 further comprising a connector at said junction, said connector removably interconnecting said first lateral support, said first vertical support, and said first cross support.

3. The desk frame as defined in claim 1 further comprising:
   a first angled connector removably interconnecting said second lateral support and said diagonal support; and
   a second angled connector removably interconnecting said diagonal support and said third lateral support.

4. The desk frame as defined in claim 1 further comprising a second cross support connected to said second vertical support.

5. The desk frame as defined in claim 4 further comprising accessory mounting means connected to said second cross support, said accessory mounting means defining a back of said desk frame.

6. The desk frame as defined in claim 5 wherein said accessory mounting means is a railing comprising:
   a body having a front face, a back face, a top end, and a bottom end;
   a plurality of hooks extending from said front face allowing engagement of an object with said railing;
   a projection extending from said bottom end terminating in a tip of a predetermined shape;
   an indentation within said top end corresponding to said predetermined shape allowing connection between said railing and an additional railing; and
   means for connecting said railing to said second cross support.

7. The desk frame as defined in claim 4 wherein said second cross support is provided with an aperture therein extending parallel to a lengthwise axis of said second cross support to permit side-to-side connection of desk frame units.

8. The desk frame as defined in claim 1 further comprising a third cross support spaced vertically downwardly from said first cross support.

9. The desk frame as defined in claim 8 further comprising an L-shaped extension connected to said third cross support having a projection for engaging a door frame.

10. The desk frame as defined in claim 1 further comprising a fourth cross support mounted on an upper surface of said second lateral support.

11. The desk frame defined in claim 1 further comprising a fifth cross support connected to said diagonal support intermediate interconnections of said diagonal support with said second and third lateral supports.

12. The desk frame defined in claim 1 further comprising a sixth cross support connected to a free end of said third lateral support, said sixth cross support constituting a secondary desk work surface support.

13. The desk frame as defined in claim 1 wherein said angle is 45°.

14. The desk frame as defined in claim 1 wherein each of said supports is an extrusion.

15. The desk frame as defined in claim 14 wherein a cross section of said extrusion has a cavity extending parallel to a central axis of said extrusion, an indentation originating from an edge of said extrusion, and a slot spaced from said indentation.

16. The desk frame as defined in claim 15 wherein said indentation is defined by opposed two-tiered rectangular cut-out sections joined by an arcuate cut-out section.

17. The desk frame as defined in claim 15 further comprising a side insert seated within said indentation for cooperating with a fastener connecting a side of said extrusion to other desk frame components.

18. The desk frame as defined in claim 15 further comprising an end insert seated within said cavity for cooperating with a fastener connecting an end of said extrusion to other desk frame components.

19. The desk frame as defined in claim 18 wherein said end insert is internally threaded.

20. The desk frame as defined in claim 14 wherein said extrusion is constructed of aluminum.

21. A desk frame comprising:

a first lateral support having a first end;

a first vertical support having a second end;

said first end and said second end being interconnected to one another to form a junction;

a first cross support extending from said junction;

a second lateral support superposed onto said first lateral support;

a diagonal support having one end interconnected to said second lateral support, said diagonal support inclined at an angle with respect to an axis of said second lateral support;

a third lateral support interconnected to another end of said diagonal support, said third lateral support constituting a primary desk work surface support;

a second vertical support connected to said first lateral support; and a second cross support connected to said second vertical support, said second cross support being provided with an aperture therein extending parallel to a lengthwise axis of said second cross support to permit side-to-side connection of desk frame units.

22. A desk frame comprising:

a first lateral support having a first end;

a first vertical support having a second end;

said first end and said second end being interconnected to one another to form a junction;

a first cross support extending from said junction;

a second lateral support superposed onto said first lateral support;

a second cross support mounted on an upper surface of said second lateral support;

a diagonal support having one end interconnected to said second lateral support, said diagonal support inclined at an angle with respect to an axis of said second lateral support; and a third lateral support interconnected to another end of said diagonal support, said third lateral support constituting a primary desk work surface support.

23. A desk frame comprising:

a first lateral support having a first end;

a first vertical support having a second end;

said first end and said second end being interconnected to one another to form a junction;

a first cross support extending from said junction;

a second lateral support superposed onto said first lateral support;

a diagonal support having one end interconnected to said second lateral support, said diagonal support inclined at an angle with respect to an axis of said second lateral support;

a third lateral support interconnected to another end of said diagonal support, said third lateral support constituting a primary desk work surface support; and a second cross support connected to said diagonal support intermediate interconnections of said diagonal support with said second and third lateral supports.

24. A desk frame comprising:

a first lateral support having a first end;

a first vertical support having a second end;

said first end and said second end being interconnected to one another to form a junction;

a first cross support extending from said junction;

a second lateral support superposed onto said first lateral support;

a diagonal support having one end interconnected to said second lateral support, said diagonal support inclined at an angle with respect to an axis of said second lateral support; and a third lateral support interconnected to another end of said diagonal support, said third lateral support constituting a primary desk work surface support;

each of said supports being an extrusion having a cross section including a cavity extending parallel to a central axis of said extrusion, an indentation originating from an edge of said extrusion, and a slot spaced from said indentation, said indentation being defined by opposed two-tiered rectangular cut-out sections joined by an arcuate cut-out section.

25. The desk frame as defined in claim 24 further comprising an internally-threaded end insert seated within said cavity for cooperating with a fastener connecting an end of said extrusion to other desk frame components.

* * * * *

(12) REEXAMINATION CERTIFICATE (4568th)
United States Patent
Kemp (10) Number: US 5,609,402 C1
(45) Certificate Issued: May 7, 2002

(54) TRADER DESK FRAME (75) Inventor: John Kemp, Columbia, SC (US)

(73) Assignee: SBFI Inc.

Reexamination Request:
No. 90/005,783, Aug. 4, 2000

Reexamination Certificate for:
Patent No.: 5,609,402
Issued: Mar. 11, 1997
Appl. No.: 08/636,725
Filed: Apr. 23, 1996

Related U.S. Application Data (63) Continuation of application No. 08/420,444, filed on Apr. 10, 1995, now abandoned, which is a continuation of application No. 08/162,491, filed on Dec. 3, 1993, now abandoned.

(51) Int. Cl.$^7$ .............................................. A47B 47/00
(52) U.S. Cl. ................................ 312/265.4; 312/265.2; 211/94.01
(58) Field of Search ........................... 312/265.1, 265.4, 312/223.3, 194, 195, 196

(56) References Cited

U.S. PATENT DOCUMENTS

| | | |
|---|---|---|
| 3,901,612 A | 8/1975 | Canin |
| 4,029,024 A | 6/1977 | Klitzky |
| 4,148,535 A | 4/1979 | Fenwick |
| D254,112 S | 2/1980 | Handler et al. |
| 4,694,965 A | 9/1987 | Parnell |
| 4,997,240 A | 3/1991 | Schmalzl et al. |
| 5,033,901 A | 7/1991 | Dias |
| 5,609,402 A | 3/1997 | Kemp |

FOREIGN PATENT DOCUMENTS

| CH | 00260384 A | 7/1949 |
|---|---|---|

OTHER PUBLICATIONS

Dorlec Corporation's Aug. 1983 catalog entitled "The Dorlec Enclosure System".
International Contract Furnishing Inc.'s 1988 catalog entitled "ICF Axial™".
SBFI's 1991 catalog entitled "Engineered Desks".
80/20 Inc.'s Jun. 1992 Catalog No. 0692A entitled "80/20 Inc. Manufacturers of 'The Industrial Erector Set®'".
Salomon Brothers Inc.'s Apr. 2, 1991, drawings entitled "Axial Trading Desk", 5 pages.
G. Robert Muller (Henegan Construction Co.) Oct. 28, 1992 letter and 5 sheets of attached drawings.

*Primary Examiner*—James O. Hansen (57) ABSTRACT

A desk frame (1) for trader desks is provided comprising a first lateral support (2), a first vertical support (5), and a first cross support (11) interconnected to each other at respective ends, a second lateral support (21) superposed onto the first lateral support (2), a diagonal support (23) interconnected to the second lateral support (21) and inclined at an angle with respect to an axis of the second lateral support (21), and a third lateral support (24) interconnected to the diagonal support (23). Supports may be interconnected to each other by three-way corner connectors (67) or angled connectors (73), and they may be directly connected to one another by means of an insert (20) seated within an indentation of a support and a fastener engaging the insert. The desk frame (1) is strengthened by two-way gussets (114) and three-way gussets (84) provided at junctions of supports. The desk frame (1) may be further provided with an extension (91) to guide doors (42) allowing for storage and access to wiring within the desk frame (1). A back railing (128) is attached to an upper support (29) to define the back of desk frame (1), to provide accessory mounting means allowing installation of such objects as monitor stands, shelves, and lamps, and to facilitate capping of a back-to-back connection of desk frame (1) with another desk frame. Means for permitting side-to-side connection between such desk frames is also provided.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability fo claims 1–20, 22 and 24–25 is confirmed.

Claims 21 and 23 are cancelled.

\* \* \* \* \*